United States Patent [19]

Lippert et al.

[11] Patent Number: 5,802,402
[45] Date of Patent: Sep. 1, 1998

[54] CAMERA BACK INCLUDING IMPROVED FILM ASSEMBLAGE

[75] Inventors: Irving S. Lippert, Lexington; Thomas H. Campbell, Jr., Dedham; Edward H. Coughlin, Norwood, all of Mass.

[73] Assignee: Polaroid Corporation, Cambridge, Mass.

[21] Appl. No.: 834,451

[22] Filed: Apr. 15, 1997

Related U.S. Application Data

[63] Continuation-in-part of Ser. No. 710,181, Sep. 13, 1996.
[51] Int. Cl.[6] .................................................. G03B 17/50
[52] U.S. Cl. ........................ 396/42; 396/586; 396/527
[58] Field of Search ............................. 396/33, 42, 583, 396/586

[56] References Cited

U.S. PATENT DOCUMENTS

| | | | |
|---|---|---|---|
| 3,779,770 | 12/1973 | Alston et al. | 396/33 |
| 3,832,731 | 8/1974 | Kinsman | 396/586 |
| 3,948,662 | 4/1976 | Alston, Jr. et al. | 396/586 |
| 4,104,667 | 8/1978 | Scholz et al. | 396/493 |
| 4,104,669 | 8/1978 | Friedman | 396/583 |
| 4,226,519 | 10/1980 | Gervais et al. | 396/366 |
| 4,972,218 | 11/1990 | Weissburg | 396/527 |

Primary Examiner—D. Rutledge
Attorney, Agent, or Firm—Robert A. Sabourin

[57] ABSTRACT

A film cassette may be used for housing film units of the self-developing type, each having a photosensitive area, a pod of processing fluid, and a leading edge. The film cassette may be used in a film assemblage, camera back, or imaging device having either a straight or a curvilinear film path configuration. One such film cassette includes: a chamber defined by forward and rear walls, a pair of side walls, and leading and trailing end walls; means for resiliently supporting the film units within the chamber; first spread control means for use when the imaging device has a straight film path configuration, the first spread control means including at least one projection formed on an interior surface of the forward wall; and second spread control means for use when the imaging device has a curvilinear film path configuration, the second spread control means including at least one projection formed on a bottom surface of the rear wall.

10 Claims, 9 Drawing Sheets

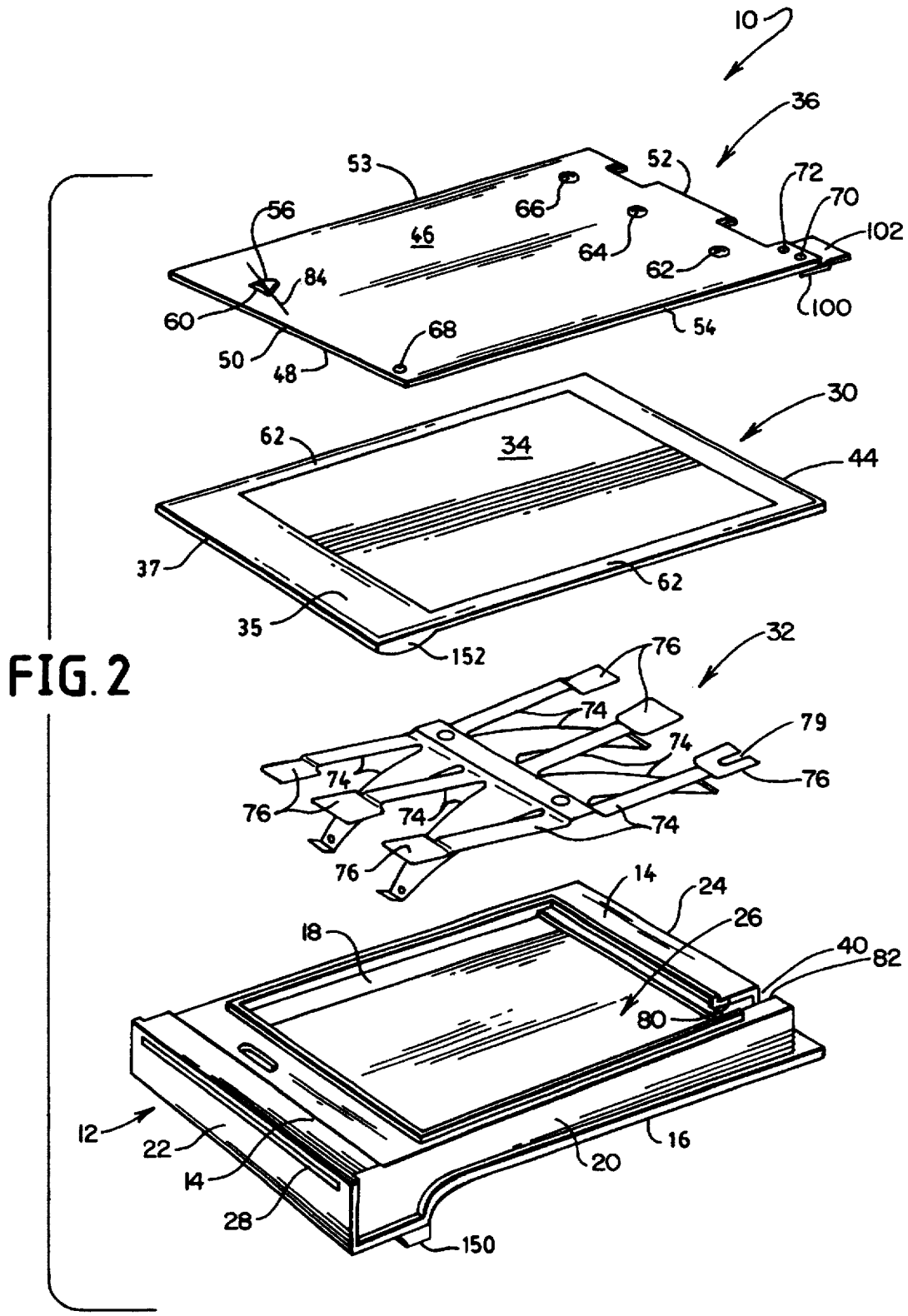

CAMERA BACK INCLUDING IMPROVED FILM ASSEMBLAGE

This application is a continuation-in-part of U.S. patent application Ser. No. 08/710,181 filed Sep. 13, 1996 by Irving S. Lippert, Thomas H. Campbell and Edward H. Coughlin.

BACKGROUND OF THE INVENTION

This invention relates generally to a camera back for use in a self-developing type of imaging apparatus and, more specifically, to a film assemblage having a cassette or cartridge for storing a plurality of self-developing film units in stacked relationship for successive exposure in the imaging apparatus.

A film assemblage including a cassette for storing a plurality of film units in stacked relationship for successive exposure in a photographic camera is disclosed in U.S. Pat. No. 4,972,218 which is herein incorporated by reference in its entirety. The cassette is adapted to be used with a photographic camera of the instant type and includes a chamber defined by forward and rear walls, a pair of side walls and leading and trailing end walls. The leading end wall includes means defining an egress opening through which a film unit may be advanced to the exterior of the cassette, and the trailing end wall includes means defining an opening for receiving a part of a camera mounted film advancing apparatus. A plurality of film units are adapted to be stacked within the chamber and a spring platen is provided for supporting a stack of the film units and for urging them towards the forward wall with the uppermost film unit in the stack being located in alignment with the egress opening.

A typical film unit, as used in the above-described film assemblage, includes a photosensitive element, an image-receiving element which may be superposed on the photosensitive element subsequent to exposure or may be transparent and predisposed on the photosensitive element such that exposure may be made through the image-receiving element, and a rupturable pod or container of processing liquid located at one end of the two elements.

In a typical self-developing type imaging system, a plurality of film units are arranged in stacked relation within the film cassette which is adapted to be inserted into the receiving chamber of an appropriate camera where a top film unit is located in the stack in position for exposure. Subsequent to exposure, the top film unit is extracted from the film cassette and is advanced, pod end first, between a pair of pressure-applying members mounted within the camera. The pressure-applying members exert a first compressive force on the pod causing it to rupture and spread or discharge the liquid between predetermined layers of the film unit, e.g., between the exposed photosensitive element and the superposed image-receiving element. Continued advancement of the film unit between the pressure-applying members results in the liquid being advanced along a liquid wavefront toward the trailing end of the film unit such that it is progressively distributed over the photoexposed area of the film unit.

The uniformity of the liquid layer is determined by several factors. One is a design of the pod and its rupture characteristics. Another is related to the viscosity and amount of liquid enclosed by the pod. The final thickness of the liquid layer is also influenced by the velocity at which the film unit is advanced through the pressure-applying members, the amount of compressing pressure exerted on the film unit, and the resistance to liquid flow at the interfaces between the liquid and the superposed film unit elements. An ideal wavefront would uniformly spread the processing composition over a substantially rectangular or square photoexposed area. This can be accomplished when the wavefront is disposed in a substantially straight line which extends outwardly to the lateral margins of the substantially rectangular or square photoexposed area and is oriented in a direction that is normal to the direction of film advancement between the pressure-applying members. In other words, the wavefront is substantially parallel to a leading edge of an advancing film unit.

One commonly observed problematic spread shape is a tongue shape wherein the wavefront progresses more rapidly at the central portion of the photoexposed or image-forming area, than at the lateral margins. This condition may be caused by an uneven distribution of liquid upon initial discharge from the pod, i.e., more liquid being concentrated at the center of the film unit than at its edges. In the subsequent spreading of the tongue-shaped wavefront, it is possible that the corners of the image-forming area at the trailing end of the film unit will be uncoated or coated with a layer of liquid of reduced depth or thickness, thus, adversely affecting the film unit's sensitometry.

One method employed to compensate for a tongue-shaped wavefront has been to provide excess liquid in the pod. Another method has been to equip the camera with spread control devices which serve to modify the shape of the liquid wavefront during spreading. Examples of film assemblages which include film cassettes having processing liquid spread control features are found in U.S. Pat. Nos. 3,832,731, 4,104,669, and 4,226,519. These examples are incorporated herein by reference.

It is well known in the art of instant photography to apply a second compressive force or pressure to the film unit, behind the pressure-applying rollers, to a selected portion or center section of the film unit for the purpose of modifying the wavefront so that it progresses in a more uniform manner toward the trailing end. This pressure selectively limits the gap between the predetermined layers at their center thereby retarding the center of the tongue shaped wavefront and allowing the fluid to be diverted outwardly to the lateral margin areas where there is less resistance to fluid flow because of the absence of the second compressive force in those areas. The wavefront is modified such that it is substantially straight and is oriented in a direction substantially normal to the parallel sides of the rectangular or square image-forming area. In other words, the wavefront is oriented in a direction which is substantially parallel to a leading edge of an advancing film unit.

In the earlier years of self-developing photography, pressure was applied with a pressure plate located between the rollers and the film exit slot or egress of the film container. More recently, the spread control structure for applying the second compressive force to the center of the film unit has been built directly into the film container and generally includes pressure applying structure located on the underside of the forward wall near the film withdrawal slot. Examples of this type of spread control feature are given in U.S. Pat. Nos. 3,779,770 and 3,948,662 and are herein incorporated by reference.

It is a primary object of the present invention to provide a film assemblage having a cassette with built-in dual independent spread control features so that the film and cassette may be used in a variety of applications such, but not limited to, camera backs, cameras, scanning devices, computer peripherals and printers. This and other objects will become apparent when reviewing the following description, drawings and claims.

SUMMARY OF THE INVENTION

A film cassette may be used for housing film units of the self-developing type, each having a photosensitive area, a pod of processing fluid, and a leading edge. The film cassette may be used in a film assemblage, camera back, or imaging device having either a straight or a curvilinear film path configuration. One such film cassette includes: a chamber defined by forward and rear walls, a pair of side walls, and leading and trailing end walls; means for resiliently supporting the film units within the chamber; first spread control means for use when the imaging device has a straight film path configuration, the first spread control means including at least one projection formed on an interior surface of the forward wall; and second spread control means for use when the imaging device has a curvilinear film path configuration, the second spread control means including at least one projection formed on a bottom surface of the rear wall.

BRIEF DESCRIPTION OF THE DRAWINGS

The best mode contemplated in carrying out this invention is illustrated in the accompanying drawings in which:

FIG. 2 is an exploded view of a film assemblage including a film cassette, a dark slide, a film unit and a spring platen built according to the principles of the invention;

DETAILED DESCRIPTION OF THE PREFERRED EMBODIMENTS

Figure 5:
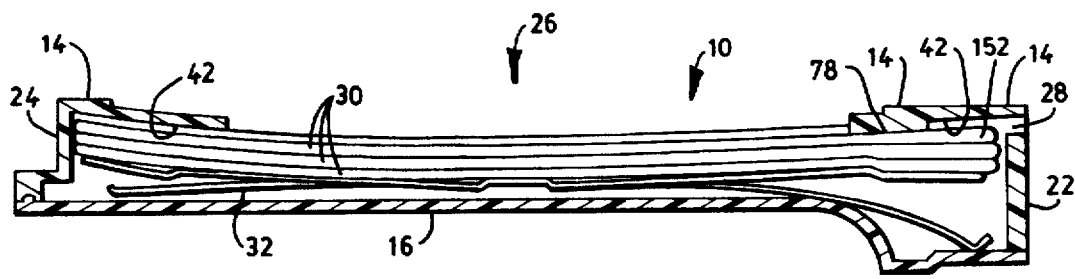
FIG. 5 is a cross-sectional view of the inventive film assemblage of FIG. 2 (without the dark slide)

Reference is now made to FIG. 2 of the drawings showing an exploded view of a photographic film assemblage 10 which includes a cassette 12 with spaced top and bottom walls 14 and 16, a pair of laterally spaced side walls 18 and 20, and longitudinally spaced leading and trailing end walls 22 and 24. The top wall 14 includes an exposure opening or window 26. The leading end wall 22 includes a film exit slot or egress 28 (see FIG. 5).

Supported within the cassette 12 is a stack of individual film units 30 (only one being shown), preferably of the instant, self-developing type and having a spring platen 32 for both supporting and urging the stack towards the top wall 14 such that the uppermost film unit 30 in the stack is located in engagement with an interior surface 42 (see FIG. 5) of the top wall 14. Thus positioned, a photosensitive area 34 of the film unit 30 is located in alignment with the exposure opening 26. Each film unit 30 includes a leading edge 37, a trailing edge 44, lateral sides 62, an upper surface 35, a pod 152 containing processing fluid and located adjacent to a lower surface (not shown), and the photosensitive area or surface 34.

A dark slide 36 is conventionally located between the uppermost film unit 30 and the interior surface 42 of the top wall 14 to prevent premature exposure of the photosensitive area 34 of the film unit 30 during the loading of the film assemblage 10 into a camera (not shown). Subsequent to such loading, a camera mounted pick (not shown) for advancing the film unit 30 is actuated such that it enters the cassette 12 via a slot 40 in the trailing wall 24 and the top wall 14 of the cassette 12 about 0.02 inches forward of sidewall 20. The pick engages a trailing edge 52 of the dark slide 36 to eject it from the cassette 12 through film exit slot 28. After ejection from the cassette 12, the dark slide 36 passes through a pair of spread rollers (not shown).

With the dark slide 36 removed, the uppermost film unit 30 is urged upwardly by the spring platen 32 into engagement with the interior planar surface 42 of top wall 14 for its subsequent exposure. Subsequent to its exposure, the aforementioned pick is again actuated so as to move it into engagement with the trailing edge 44 of film unit 30 to move the latter partially out of the cassette 12 via the slot 28 and into the bite of the aforementioned spread rollers.

The dark slide 36 includes an upper surface 46, a lower surface 48, a leading edge 50 combined with the trailing edge 52 and a pair of side edges 53, 54. A truncated ridge 56 is struck from below to cause the ridge to project from the upper surface 46, the ridge having an axis which is generally parallel to side edges 53, 54. The ridge itself rises in a smooth curve from the upper slide surface 46 to an increasing height in a direction toward the leading edge 50 and terminates in a planar surface 60 which extends generally perpendicular to side edges 53, 54, the function of which will be described in more detail subsequently. A plurality of dimples of projections 62, 64, 66 are struck from the upper surface 46 of the slide 36 causing downwardly projecting dimples to protrude from the lower surface 48 thereof and provide a combined dimple and dark slide thickness about the same thickness as the film unit 30 to prevent the pick from accidentally ejecting upper film unit 30 from the film cassette 12 before its exposure upon the actuation of the pick to eject the dark slide 36.

A downward projecting dimple 68 near the forward edge 50 near side edge 53 maintains the spacing of the dark slide 36 from the upper surface 35 of the underlying film unit 30. A pair of smaller dimples or projections 70, 72 hold the trailing edge 52 of the dark slide 36 in position as they straddle the area to be engaged by the pick during normal operations.

The dark slide 36 is formed of extruded polystyrene having a thickness of 12 to 14 mils. The dark slide 36 provides both strength against tearing and the ability to deform upon the formation of truncated ridge 56, surface 60 and dimples 62, 64, 66, 68, 70 and 72.

A fragmentary plastic layer 100 is adhesively bonded to lower surface 48 of the dark slide 36 and includes a tail 102. The tail 102 extends rearwardly beyond the trailing edge 52 of dark slide 36 to provide a light blocking layer to shield the film unit 30 from light entering the cassette 12 through the pick slot 40.

The spring platen 32 in FIG. 2 includes one leg 74 having a foot 76 with a gap 79 therein. The slot 40 in the top wall 14 of the cassette 12 is positioned such that the top wall 14 adjacent the edges 80, 82 of slot 40 serves as a reinforcing shoulder to counteract the upward pressure of the foot 76 containing the gap 79 at the trailing edge of the film unit 30. The gap 79 is particularly included in the foot 76 to accommodate the reciprocating movement of the pick while still maintaining the trailing edge 44 of the last film unit 30 pressed upwardly against the flat inner surface 42 of top wall 14 of the cassette 12. In this manner, the pick cannot accidentally engage the spring platen 32 during its ejection stroke.

The film assemblage 10 of FIG. 2 is unique since the cassette 12 contains dual independent spread control features which give the film assemblage 10 the versatility for use in different imaging systems, e.g. different cameras, camera backs and printers. In other words, two different imaging devices which require different film packs or film assemblages may now operate using the same film assemblage 10 built in accordance with the present invention. For instance, the film assemblage 10 may be used in the camera 120 of FIG. 6 having a straight film path configuration, or in the camera 130 of FIG. 7 having a curvilinear film path configuration. In both FIGS. 6 and 7, only the lower sections of the cameras 120 and 130, respectively, are illustrated for simplicity in explaining the invention.

Figures 3, 4:
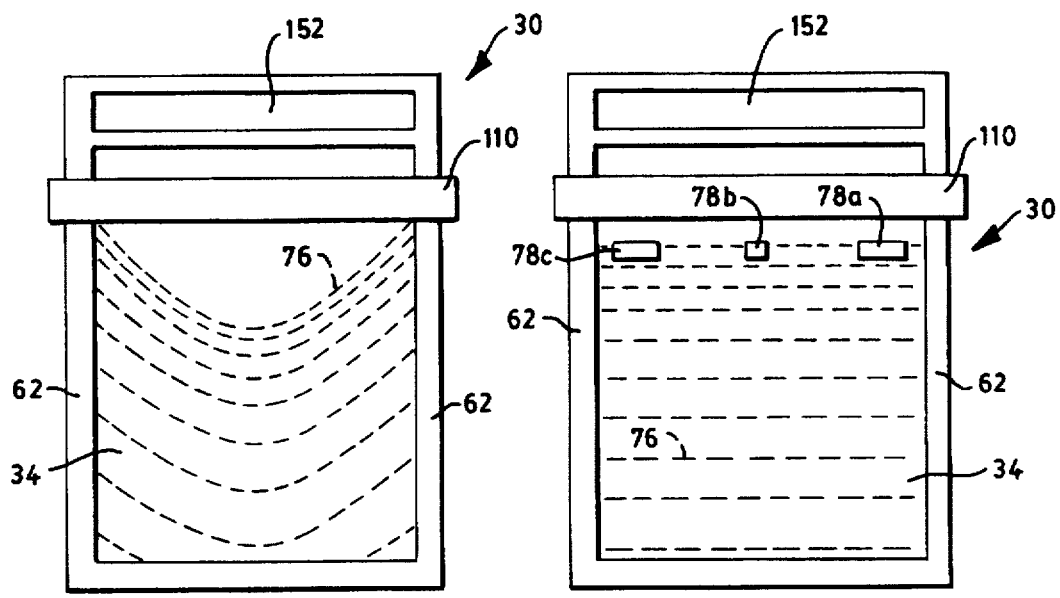
FIG. 3 is an elevational view of a film unit showing the progressive advancement of a liquid wavefront, in dotted lines, to illustrate the distribution of processing composition when distribution control members are not utilized in the spread system.
FIG. 4 is an elevational view of a film unit showing progressive advancement of a liquid wavefront, in dotted lines, showing modification of the shape of the wavefront caused by the distribution control members.

As previously mentioned, a common problem with distribution of photographic processing fluids is a tongue or bow-shaped wavefront 76 as illustrated in FIG. 3. The processing liquid initially tends to move towards the trailing end of the exiting film unit more rapidly at the central portion of the photoexposed image-forming area 34 than out at lateral margins 62 thereof. This is generally caused by more processing fluid being concentrated at the center of a pod 152 of a film unit 30 than near the lateral margins 62.

In order to control the distribution of the processing fluid as it is spread by a first compressive force applied by a pair of spread rollers 110 (FIG. 6) which are mounted within a lower housing 122 of the camera 120, the film assemblage 10 is provided with a spread control or processing fluid distribution device. Such a device may take the form of one or more members which are adapted to apply a second compressive force to the central portion of the film unit 30 in the path of the liquid wavefront 76. The added pressure increases the resistance to fluid flow at the central portion of the film unit 30 thereby selectively retarding the center of the liquid wavefront 76 and causing a flow of processing fluid outwardly towards the lateral margins 62 of the film unit 30 to cause a more uniform lateral distribution.

Figure 1A:
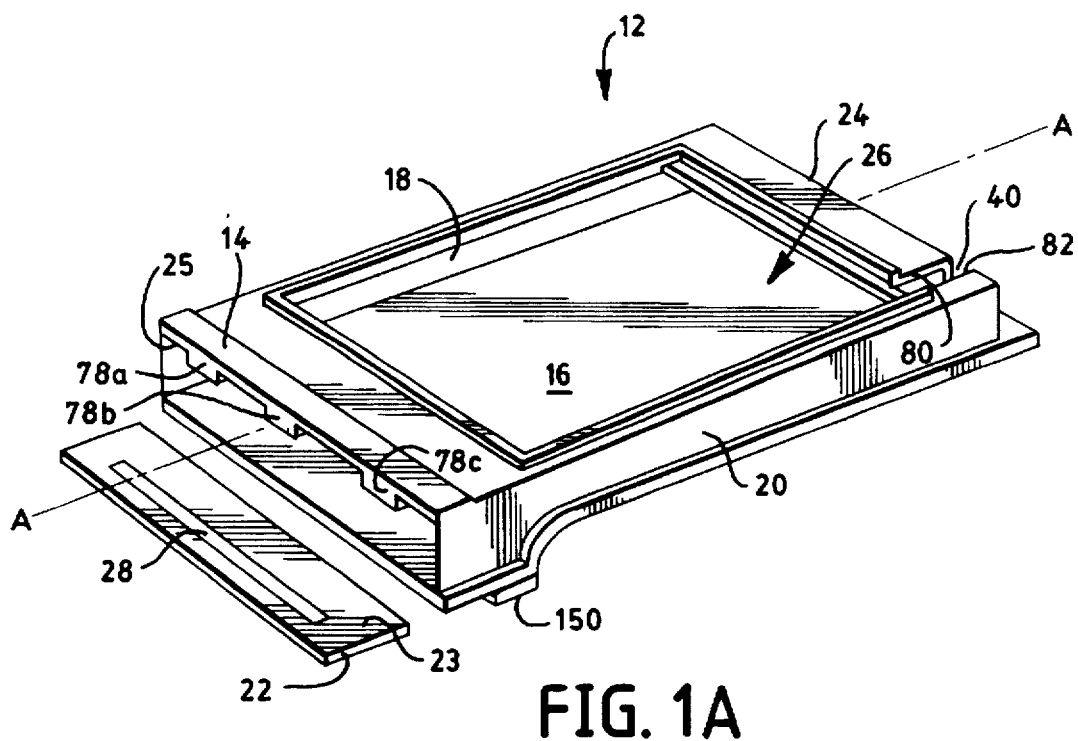
FIG. 1A is a perspective top view of a film cassette built according to the principles of the invention with the leading end wall removed.
Figure 1B:
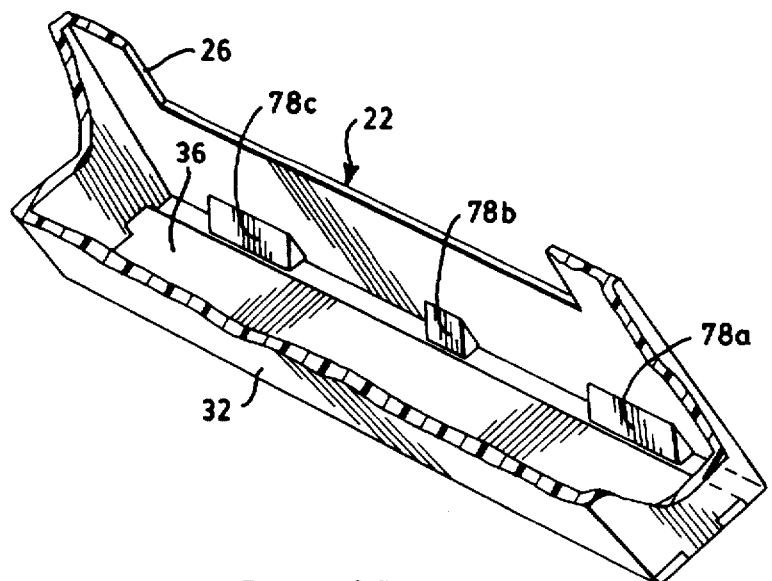
FIG. 1B is a rear cutout view of a section of the cassette of FIG. 1A.
Figure 6:
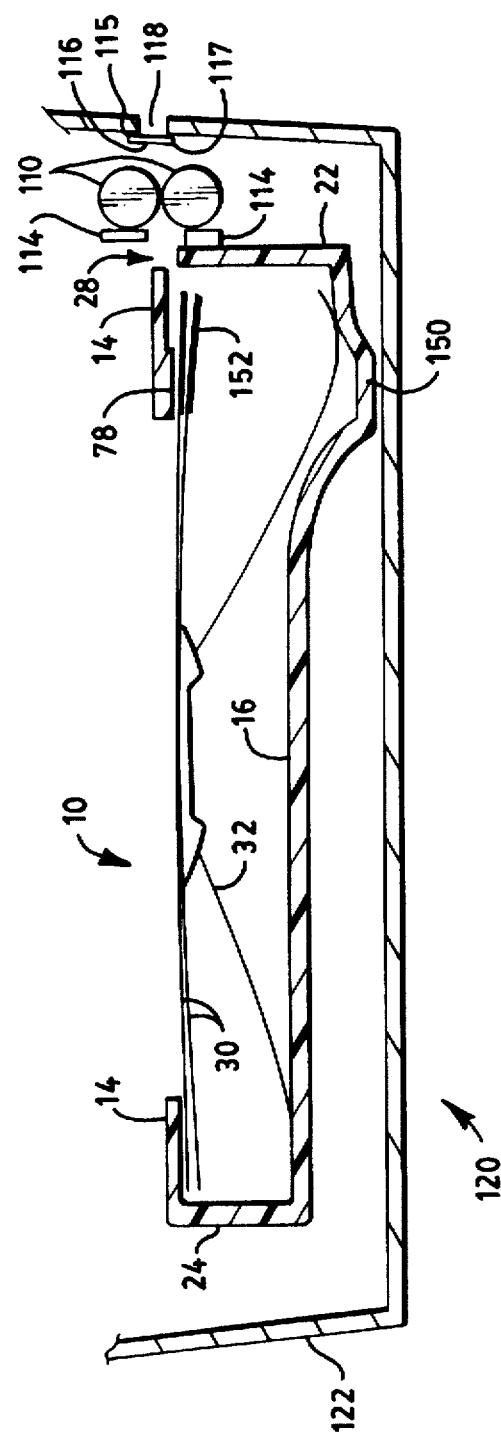
FIG. 6 is a cross-sectional view of a camera back or a lower portion of a camera, having a straight film path configuration, built according to the principles of the invention.

In a preferred embodiment using the inventive film cassette or film assemblage in, for instance, a camera or camera back having a straight film path configuration, the first spread control device of the cassette 12 may include one or more projections 78a, 78b and 78c as shown in FIGS. 1A, 1B and 6, projecting from an interior surface 25 of the top wall 14 adjacent the film exit slot 28 at the leading end of the cassette 12. In the embodiment illustrated in FIGS. 1A and 1B, three such projections 78a, 78b and 78c are symmetrically disposed about a longitudinal center line A—A of the cassette 12. Preferably, the projections 78a, 78b and 78c are formed of a thermoplastic material and may be integrally molded to the interior surface 25 of the top wall 14. The projections or spread control features 78a, 78b and 78c may be formed flush with the leading end wall 22 as shown in FIGS. 1A and 1B, or they may be spaced some predetermined distance from the leading end wall as shown in FIG. 6. It will be noted that the projections 78a, 78b and 78c are tapered to increase in depth in the direction of film advancement through film exit slot 28 to provide a smooth transition surface between forward wall 22 and film exit slot 28.

The projections 78a, 78b and 78c engage the top surface 35 of the uppermost film unit 30 (see FIGS. 2 and 5) which includes the image-receiving surface 34. The top surface 35 of this film unit 30 is held in engagement with projections 78a, 78b and 78c by the upward force of the spring platen 32. After the topmost film unit 30 has been exposed, it is advanced through the exit slot 28 via spread rollers 110 (FIG. 6). The spread rollers 110 apply a first compressive force upon the film unit 30 causing the pod 152 to rupture so that the processing fluid is discharged rearwardly towards projections 78a, 78b and 78c.

It is noted that the projections 78a, 78b and 78c are aligned in a straight line which is spaced apart from, but is substantially parallel to, the axes of rotation of spread rollers 110 such that the initial discharge of processing liquid occurs intermediate to the spread rollers 110 and the projections 78a, 78b and 78c. While the projections 78a, 78b and 78c and the leading end wall 22 cooperate to apply a second compressive force to pod 152 as it advances through slot 28, the amount of compressive pressure is not sufficient to cause the pod seal (not shown) to rupture. The initial discharge of processing liquid is caused solely by the first compressive force applied to pod 152 by spread rollers 110.

Continued advancement of the film unit 30 through the exit slot 28, through the nip of the spread rollers 110, past the light shield 116 and through the camera exit slot 118 causes spread rollers 110 to spread the liquid towards the trailing end 44 of the film unit 30. As viewed in FIG. 4, projections 78a, 78b and 78c modify the shape of the wavefront 76 by applying the second compressive force to the central portion of the film unit 30 in the path of the wavefront 76. This second compressive force selectively increases the resistance to fluid flow and retards the advancement of the center portion of the wavefront 76.

With spread rollers 110 applying the first compressive force behind the mass of processing liquid, and projections 78a, 78b and 78c applying the second compressive force to the central portion of the fluid flow path in front of the mass of liquid, a portion of the concentration of processing fluid at the center of the film unit 30 seeks the path of least resistance and tends to flow transversely of the direction of film advancement toward the lateral margins 62 of the film unit 30. Thus, the distribution of processing liquid between the lateral margins 62 becomes more uniform and the shape of the wavefront 76 is modified, as illustrated in FIG. 4, such that it is substantially straight and normal to margins 62. The wavefront is thus substantially parallel to a leading edge of an advancing film unit.

The above preferred embodiment uses three separate projections 78a, 78b and 78c to provide spread control of the processing fluid. It must be emphasized that this spread control device is suitable for use with a particular type of film unit. With another type of film unit having different pod rupture characteristics or possibly including a fluid having a different viscosity, the projections 78a, 78b and 78c may be shaped differently or have different spacing, or they may or may not be symmetrically disposed about the center line A—A of the cassette 12. Further, the number of projections 78a, 78b and 78c may be increased or decreased to even include only one elongated projection. Any of the elongated projections may vary in height, length, width and overall shape. Also, the spacing between the projections 78a, 78b and 78c and the spread rollers 110 may vary. With one type of film unit, the projections 78a, 78b and 78c may be set back from exit slot 28 towards the trailing end of the film cassette 12, or conversely, the projections 78a, 78b and 78c may be set closer to the exit slot 28.

When the advancing film unit 30 first exits an imaging device such as camera 120 in FIG. 6 through exiting means or slot 118, light incident to the exiting film unit may travel along the photosensitive surface of the film unit, a condition called light piping, causing excessive, unwanted, uneven exposure or fogging of the photosensitive surface. Light piping can be minimized by postponing light contact with the exiting film unit 30. This is accomplished using a light shielding means or film shade 116. FIG. 6 illustrates a film shade 116 as a single component attached, as by gluing, at 115 to an inner side of the lower housing 122 of the camera 120 in a manner to cover or overlap the exit slot 118. The lower section 117 of the film shade 116 overlaps the opening 118 as shown. The film shade 116 may be composed of a flexible, non-coiled, non-light penetrating material. Upon contact of the film shade 116 with the advancing film unit 30, the film shade 116 flexes to allow the film unit to exit the camera through exit means 118. As the film unit exits the camera, the film shade 116 will extend (not shown) outside of the exit slot 118 along the photosensitive surface of the film unit 30 until the film unit is completely expunged. At that point, the resiliency of the film shade 116 will cause it to retract to its original position as shown in FIG. 6.

The film shade may alternately be composed of two or more overlapping pieces of flexible, non-coiled, non-light penetrating material. The dimensions such as thickness, width and length of the film shade 116 may be varied, as necessary, in accordance with parameters such as the type of film being used, the dimensions of the slot 118, the flexibility and opaqueness of the material from which the film shade is made, etc.

Figure 7:
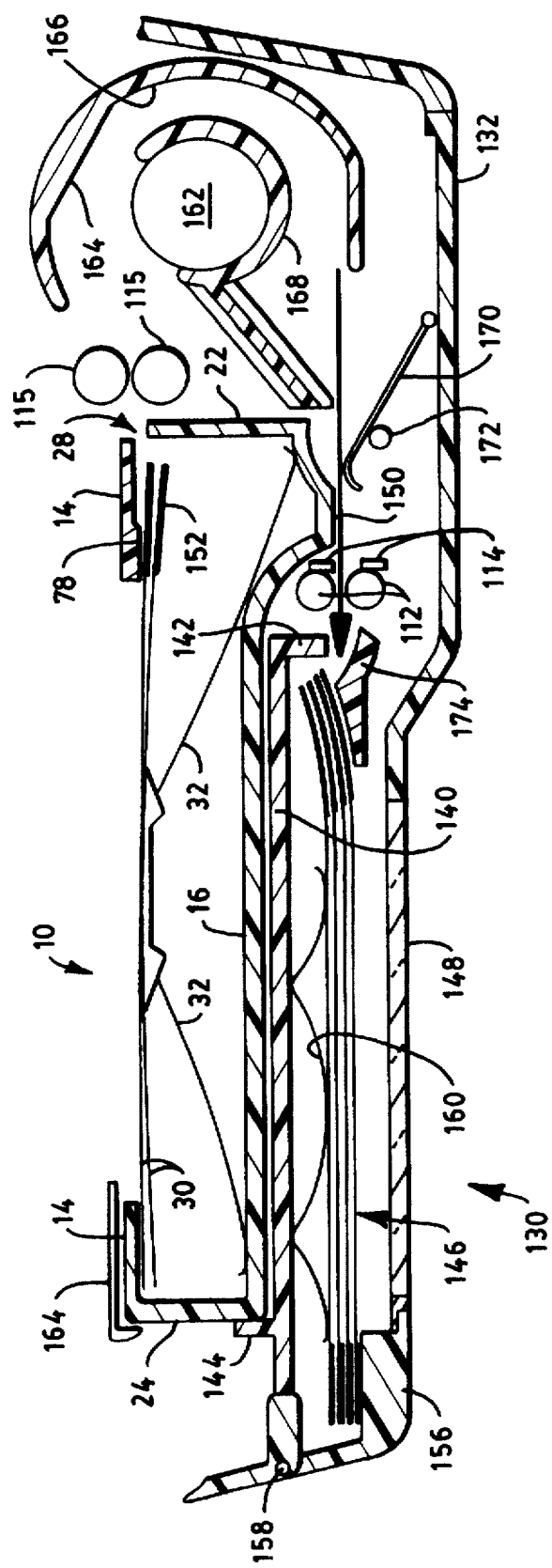
FIG. 7 is a cross-sectional view of a camera back or a lower portion of a camera, having a curvilinear film path, built according to the principles of the invention.

In addition to its use in a camera or camera back 120 having a straight film path configuration as described above, the film assemblage 10 of the invention may also be used in a camera or camera back 130 having a curvilinear film path configuration as illustrated in FIG. 7. FIG. 7 gives a sectional view of a lower portion 132 of a camera 130 which houses the previously described film assemblage 10. The camera 130 includes a plate 140 for supporting the film cassette 12 in position for the sequential photographic exposure of the film units 30. The plate 140 includes a downwardly extending end section 142 and an upwardly standing flange 144 for engaging the trailing end wall 24 of the cassette 12, thereby properly locating the film cassette 12 relative to the reflected optical axis of the objective lens (not shown) of the camera.

The lower portion of the camera 130 also includes an imbibition chamber 146 which is defined in part by a loading door 148, the support plate 140, the end section 142 and forward and rear walls (not shown) of the lower housing 132. The imbibition chamber 146 provides an environment in which exposed film units 30 may be located during the period that the aforementioned processing liquid is being imbibed by one or more layers of the film unit 30. As the exposed film unit 30 enters the chamber 146, it is shielded from light which may be actinic to the exposed film unit 30.

Exit of the film units 30 from the imbibition chamber 146 may be had by way of an egress opening formed in the upstanding end wall of the loading door 148, such opening being closed by a door 156 which is pivotally mounted at pivot 158. A spring 160 is mounted on the supporting plate 140 for frictionally maintaining the exposed film units 30 in place within the imbibition chamber 146.

Figure 8:
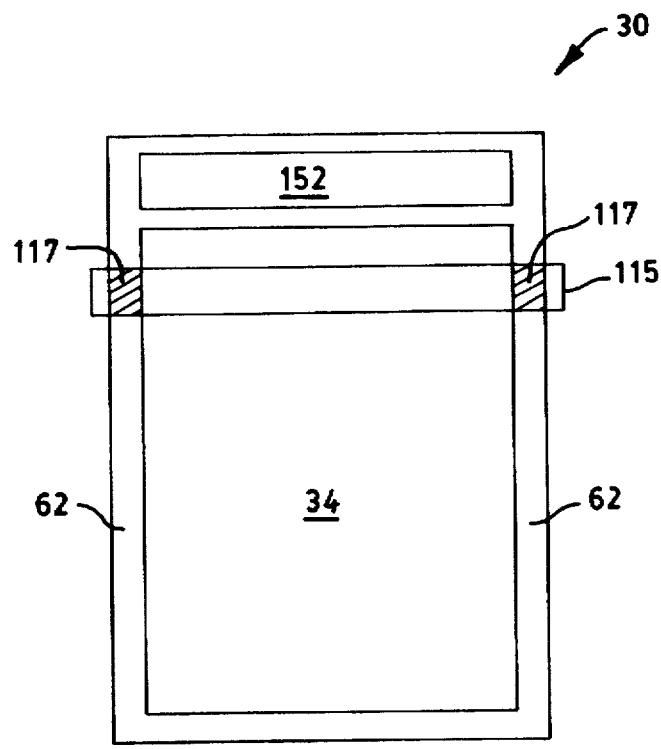
FIG. 8 is an elevational view of a film unit showing feed rollers having friction wheels for advancing the film unit.

Subsequent to the exposure of a film unit 30, a motor 162 is energized to drive a first film engaging member 164 in a reciprocating manner to engage the exposed film unit 30 by its trailing edge 44 and advance it to the exterior of the film cassette 12 via the film exit opening 28 formed in the leading end wall 22 of the cassette 12. As the exposed film unit 30 emerges from the cassette 12, it enters the bite of laterally spaced pairs (only one pair being shown) of motor driven friction wheels 117 mounted onto feed rollers 115. The friction wheels 117 (shown in FIG. 8) engage lateral margins 62 of the exposed film unit 30 outside of the photosensitive area 34, and outside of the ends of the pod 152 which holds the processing liquids. The pod 152 will not rupture since the pressure of the friction wheels 117 is applied only along the lateral margins 62, and not upon the pod 152. Also, the nip between feed rollers 115 is spaced so that the exposed film unit 30 will be moved therethrough without rupturing the pod 152. The two pairs of friction wheels 117 continue the movement of the exposed film unit 30 until its leading end is located in the bite of a pair of motor driven spread rollers 112 having a length at least equal to the width of the exposed film unit 30. During such movement, the leading end of the exposed film unit 30 engages a film unit engaging member 164 which guides the exposed film unit 30 about a curvilinear surface 166 around a motor 162 and its support 168 and directs the exposed film unit 30 into the bite of the spread rollers 112. The film unit engaging member or pick 164, the pairs of friction wheels 117 mounted on feed rollers 115, and the spread rollers 112 together define a film advancing means. Just prior to entering the bite of the spread rollers 112, the exposed film unit 30 moves between a pivotally mounted pressure plate 170 and a second spread control device 150 built into the film cassette 12. As with the first projections or spread control device 78a, 78b and 78c, the second spread control device 150 is preferably formed of a thermoplastic material which is integrally molded onto the cassette 12 of the film assemblage 10.

The spread rollers 112 continue the uninterrupted movement of the exposed film unit 30 toward the imbibition chamber 146 while simultaneously rupturing the pod 152 in the same manner as previously described for the straight film path embodiment of FIG. 6. As the processing fluid is expressed from the pod 152, it defines a wave of processing liquid whose configuration is influenced by a damming effect caused by the cooperation between the pressure plate 170 and the spread control surface 150. The thickness of the layer of processing fluid being spread by the rollers 112 may be controlled by moving an adjustable stop pin 172 toward or away from the pressure plate 170.

Figure 9:
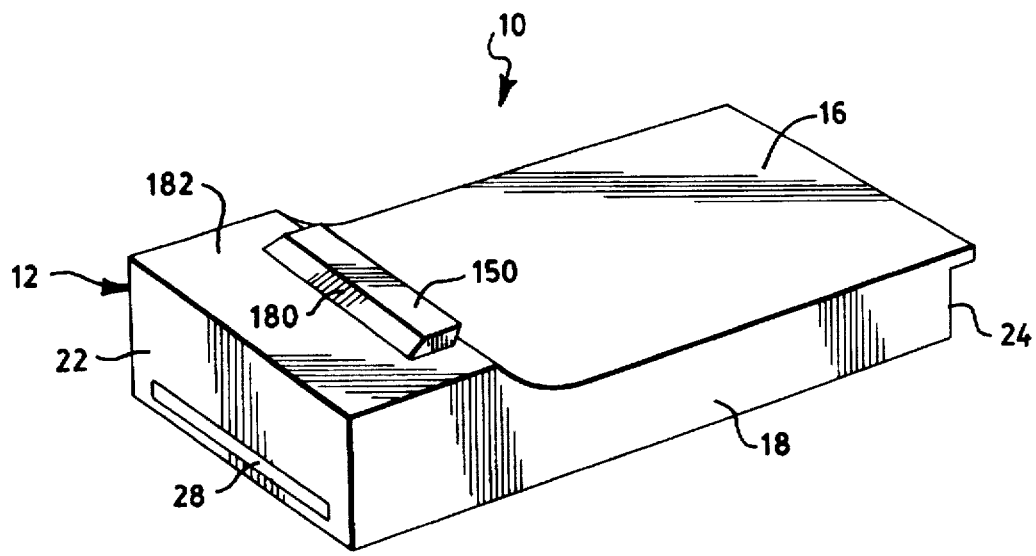
FIG. 9 is a perspective bottom view of the film cassette of FIG. 1A.

The spread control structure 150 is molded onto a bottom surface 182 of the bottom wall 16 of the film cassette 12 as illustrated in FIGS. 1A, 2 and 9. It operates in a similar fashion to the previously described spread control feature 78a, 78b and 78c. The preferred embodiment of FIG. 9 includes a film assemblage 10 having a cassette 12 with a bottom surface 182 and the spread control projection or device 150 extending therefrom. The spread control projection 150 is tapered to increase in depth in the direction of film advancement so that distribution of the processing fluid will occur smoothly. The number of projections of the spread control device 150 may be increased, if desired, and they may vary in height, width, length and overall shape.

As the exposed film unit 30 emerges from the spread rollers 112, its leading edge engages a film deflector plate 174 which deflects the film unit 30 between the underside of the trailing end of a previously exposed film unit 30 located in the imbibition chamber 146. The spread rollers 112 continue to drive the exposed film unit 30 completely into the imbibition chamber 146 where development continues and it is stored for later retrieval by the camera user.

An imaging device according to the invention may also include means for cleaning the spread rollers. For instance, FIGS. 6 and 7 both illustrate cleaning pads 114 in continuous contact with the respective spread rollers 110 and 112. These cleaning pads may be made from any material which adequately removes dust and other impurities from the spread rollers. In a preferred embodiment, the cleaning pads may be made of Imperial Polishing Film without aluminum oxide or J. B. Martin 2120 black velvet. The materials of the cleaning pads are sized, selected and located to optimize dirt removal without inhibiting the operation of the spread rollers or damaging the spread rollers through abrasion. Material selection for the cleaning pads is further influenced by cleaning pad parameters such as pressure, setting and contact area. Further, the cleaning pads may be electrostatically charged to remove (or repel) electrostatically charged particles, if desired.

The lower portions of the cameras 120 and 130 shown in FIGS. 6 and 7, respectively, may also represent camera backs incorporating the aforementioned features of the invention. Furthermore, any imaging device which uses a camera back (e.g. FIGS. 6 and 7), a film assemblage (e.g. FIGS. 2 and 5) or a film cassette (e.g. FIGS. 1A and 9) falls within the purview of the invention.

Figure 10:
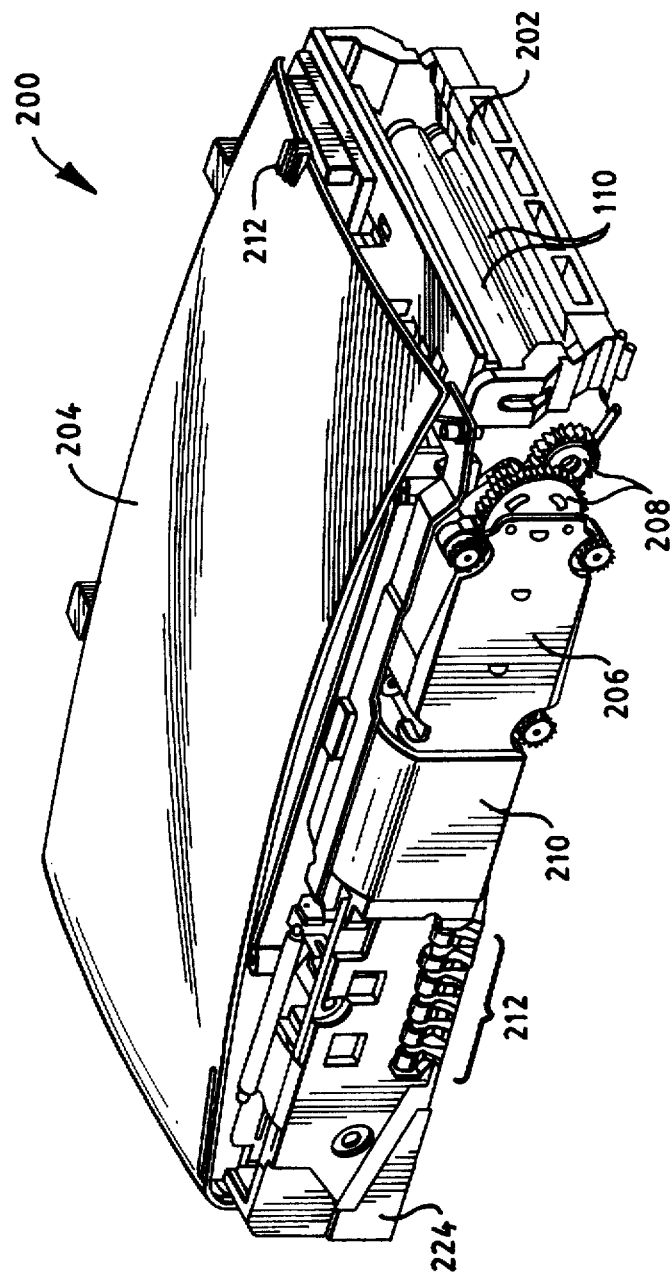
FIG. 10 is a perspective view of one embodiment of a camera back in a closed position built according to the principles of the invention.
Figure 11:
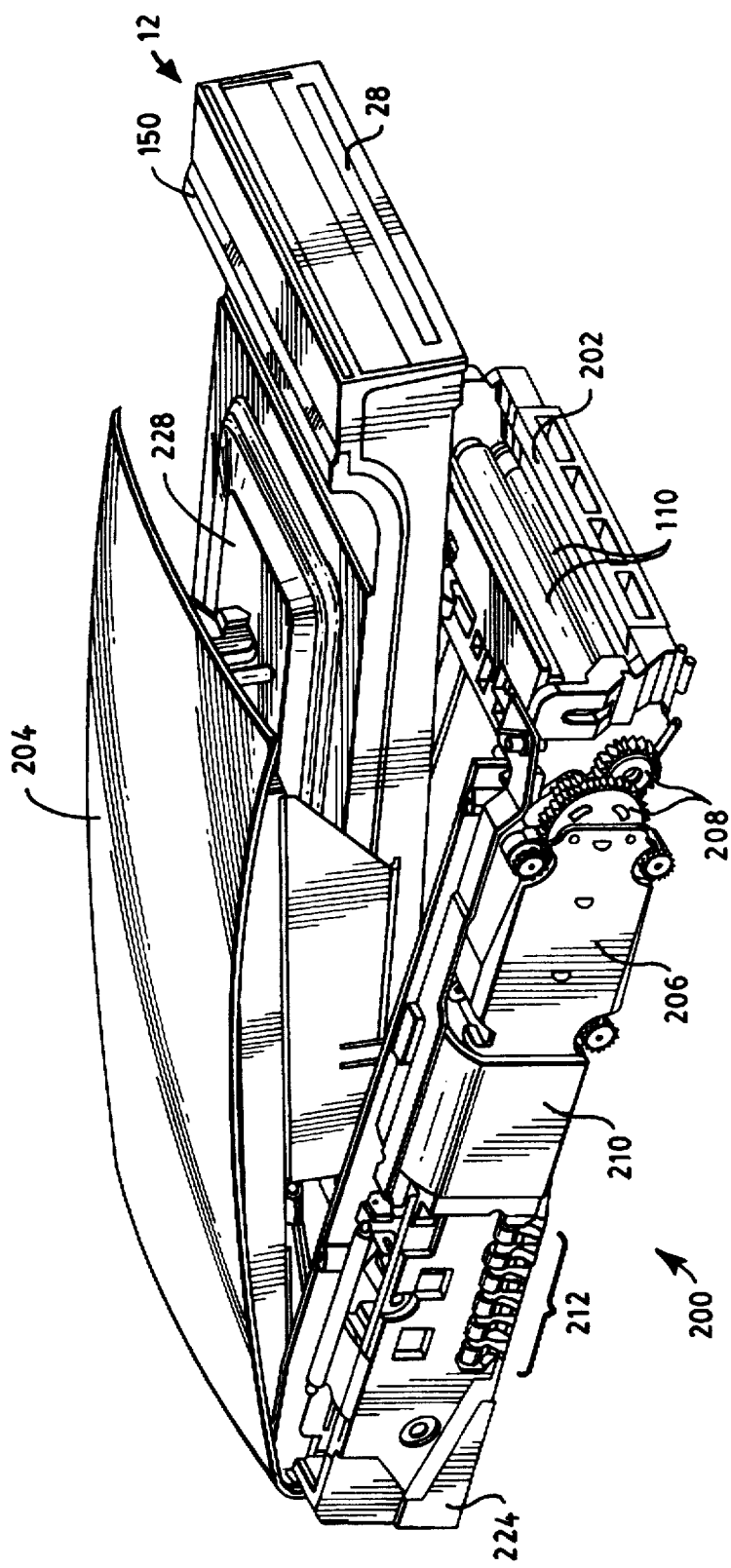
FIG. 11 is a perspective view of the camera back of FIG. 10 in an open position.
Figure 12:
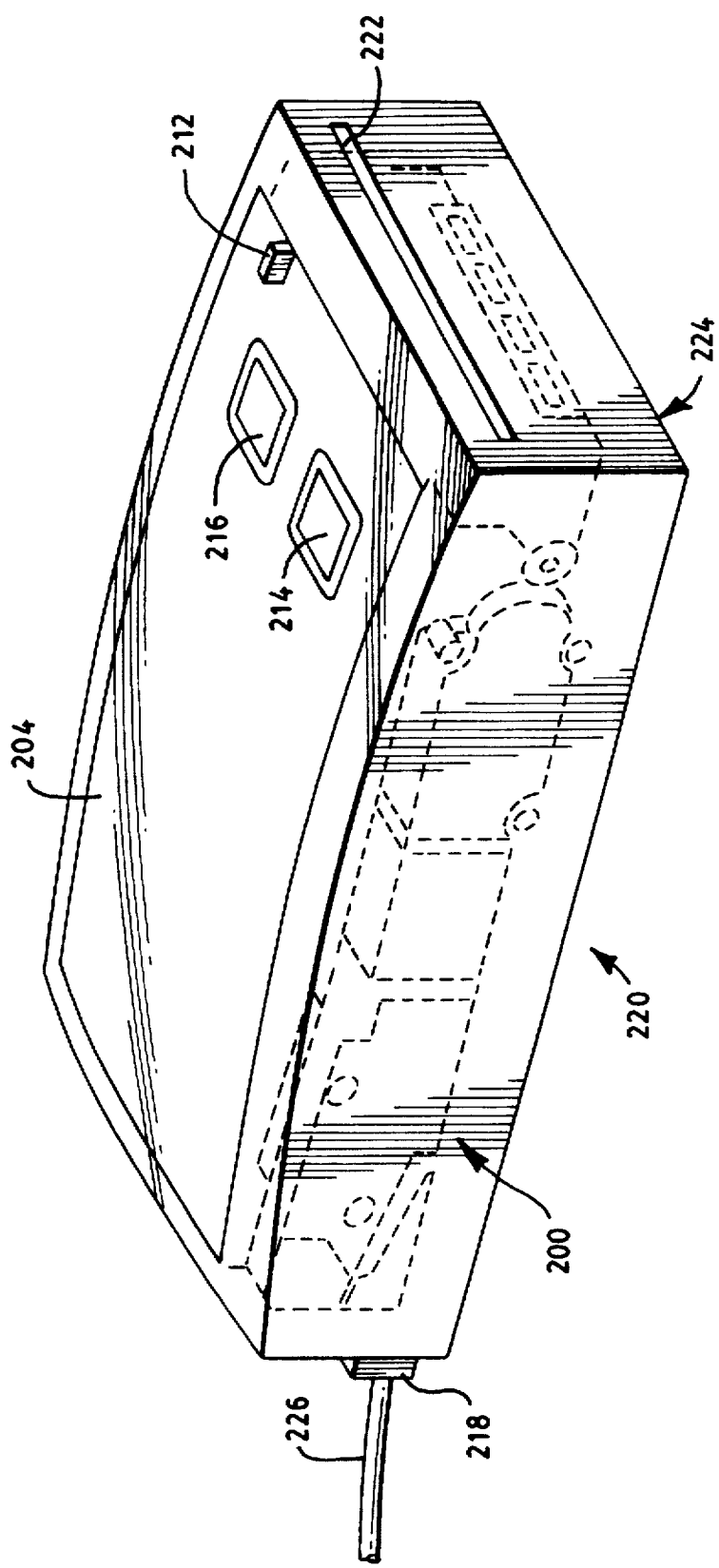
FIG. 12 is a perspective view of a printer using the camera back (shown by dotted lines) of FIG. 10.

Another example of a camera back 200, which may be used in a printer 220, is illustrated in FIGS. 10, 11 and 12. FIG. 10 shows the camera back 200 in a closed position, FIG. 11 shows the camera back 200 in an open position ready for loading a film cassette 12, and FIG. 12 shows the camera back 200 installed into a printer 220. The printer 220 includes a housing or casing 224 having an exit means, in this case a slot, 222 for allowing an exposed and processed film unit to exit from the printer 220. A door 204 of the printer, which alternatively may act as a door 204 of the camera back 200 illustrated in FIGS. 10 and 11, may include operator controls such as a print button 214 to initiate printing and a memory button 216 to transfer the printed image into a memory (not shown). A door latch 212 is shown to facilitate opening and closing the door 204. The printer 220 is attached, via connector 218 and cable 226, to a digital input device (not shown), such as a digital camera or a computer, which provides a digital image to be received by the printer 220.

The camera back 200 includes a door 204, a frame or housing 224, electric connectors and switches 212, a motor 210, a gear train housing 206 containing numerous gears 208 (not all gears are shown), spread rollers 110, and deflector surface 202. When the operator pushes the print button 214, a signal is sent through the cable 226 to the digital input device which, in turn, sends a digital image to the printer 220. The digital image is scanned onto the topmost film unit (not shown) of the film cassette 12 and the film advancing mechanism (not shown) is initiated to transfer the advancing film unit through the camera back 200. The electrical power for operating the camera back 200 originates in a film battery 228 of the film cassette 12. When the print button 214 is pushed, a start signal from one of the switches 212 causes the gears 208 to rotate which, in turn, activates the film advancing mechanism and the spread rollers 110. The advancing film unit exits through the nip of the spread rollers and is redirected towards the exit slot 222 by the deflector surface 202.

Since certain changes may be made in the above product without departing from the scope of the invention herein involved, it is intended that all matter contained in the above description or shown in the accompany drawings shall be interpreted as illustrative and not in a limiting sense. For example, while the forward wall of the film cassette has been described as having an exposure opening therein, it could be omitted and the film units would be photographically exposed after their removal from the film cassette.

What is claimed is:

1. A film cassette for use in housing film units to be exposed in an imaging device having spread rollers, the film units being of the self-developing type each having a photosensitive area, a pod of processing fluid adjacent a leading edge and a trailing edge, said film cassette comprising:

a chamber defined by forward and bottom walls, a pair of side walls, and leading and trailing end walls, wherein said leading end wall defines an egress through which one of the film units may be advanced from said film cassette;

means for resiliently supporting the film units within said chamber;

first spread control means on an interior surface of said top wall for applying compressive forces on the film unit for spreading processing fluid in the film unit when the film unit exits the egress; and second spread control means on an exterior surface of said bottom wall for applying compressive forces on the film unit for spreading processing fluid in the film unit so that the film unit engages said second spread control means after the film unit exits said egress and travels a curvilinear film path.

2. The film cassette of claim 1, wherein said trailing end wall includes means defining an opening for receiving a portion of a film advancing means of the imaging device.

3. The film cassette of claim 1, wherein said first spread control means is formed adjacent to said egress.

4. The film cassette of claim 1, wherein said second spread control means is spaced from said leading end wall.

5. A film assemblage for use with an imaging device having spread rollers, said film assemblage comprising:

a film cassette including a chamber defined by forward and bottom walls, a pair of side walls, leading and trailing end walls, and first and second spread control means;

a plurality of film units being self-developing and stacked within said chamber, each said film unit having a photosensitive area, a pod of processing fluid, and a leading edge;

means for resiliently supporting said stack of film units, said first spread control means including at least one projection from an interior surface of said forward wall for applying compressive forces on each said film unit for spreading processing fluid in each said film unit when each said film unit exits an egress, said second spread control means including at least one projection from a bottom surface of the bottom wall for applying compressive forces on each said film unit for spreading processing fluid in each said film unit so that each said film unit engages said second spread control means after each said film unit exits said egress and travels a curvilinear film path.

6. Apparatus adapted to be coupled to an image recording device, said apparatus comprising:

a housing adapted to be coupled to an image recording device, said housing including film exiting means for allowing exiting of a film unit therefrom, and for at least partially enclosing a film assemblage;

a film assemblage mountable in said housing, said assemblage including a film cassette having a chamber defined by forward and bottom walls, a pair of side walls, leading and trailing end walls, said cassette including at least first spread control means, an imaging aperture, and a film egress; said film egress being aligned with said exiting means for allowing a film unit to pass along a generally straight path as said film unit travels from said egress to and through said exiting means; a plurality of self-developable film units stacked within said chamber, each of said film units having a photosensitive area alignable with said imaging aperture for allowing exposure thereof by the image recording device, and, a pod of processing fluid; and, means for resiliently supporting said stack of film units;

film advancing means for advancing a topmost film unit of said stack through said egress and advancing it to pressure applying means;

pressure applying means interposed between said egress and said exiting means for rupturing said pod, spreading said processing fluid over said photosensitive area, and further advancing said film unit from said exiting means;

said first spread control means on an interior surface of said top wall for applying compressive forces on said film unit for spreading processing fluid in said film unit following pod rupture as said film unit exits said egress and travels toward said exiting means; and, means adjacent said exiting means for engaging portions of each of said film units over said photosensitive area which emerge from exiting means thereby reducing lightpiping to said photosensitive area.

7. The apparatus of claim 6, wherein said pressure applying means comprises a pair of spread rollers for rupturing said pod of said advancing film unit and distributing said processing fluid by application of a first compressive force, thereafter said first spread control means applying a second compressive force to said processing fluid for controlling distribution of said processing fluid over said photosensitive area.

8. The apparatus of claim 6, wherein said application of a second compressive force distributes a wavefront of said processing fluid substantially parallel to said leading edge of said advancing film unit.

9. The apparatus of claim 6, wherein said application of a second compressive force distributes a wavefront of said processing fluid substantially normal to a direction of advancement of said film unit.

10. The apparatus of claim 6, further comprising at least one cleaning pad adjacent to and continuously cleaning at least one of said spread rollers.

* * * * *